United States Patent [19]

McIlvaine et al.

[11] Patent Number: 4,609,090

[45] Date of Patent: Sep. 2, 1986

[54] METHOD AND APPARATUS FOR MOVING AND HANDLING HEAVY OBJECTS

[76] Inventors: George V. McIlvaine, 10301 Barnsdale Dr., Boise, Id. 83704; Thompson A. Baker, 2335 Springwood, Meridian, Id. 83642; Walter U. Uebelacker, 11088 Edna, Boise, Id. 83704

[21] Appl. No.: 441,933

[22] Filed: Nov. 18, 1982

[51] Int. Cl.⁴ .................. B65G 47/24; B65G 11/00
[52] U.S. Cl. ........................ 193/47; 193/38; 198/406; 198/410
[58] Field of Search ............ 198/410, 406, 416, 409; 193/38, 41, 44, 45, 46, 47, 48; 414/758, 768, 770, 780, 781, 14, 538; 254/88; 74/567, 569

[56] References Cited

U.S. PATENT DOCUMENTS

| | | | |
|---|---|---|---|
| 2,420,130 | 5/1947 | Foss | 254/88 |
| 2,499,499 | 3/1950 | Hedburg | 193/47 |
| 2,500,361 | 3/1950 | Jordan | 193/47 |
| 3,033,052 | 5/1962 | Mouchon | 74/567 |
| 3,361,418 | 1/1968 | Fromont et al. | 198/416 |
| 3,693,954 | 9/1972 | Toperzer et al. | 198/416 |

FOREIGN PATENT DOCUMENTS 2907839  9/1979  Fed. Rep. of Germany ...... 198/410

Primary Examiner—Robert J. Spar
Assistant Examiner—Daniel R. Alexander
Attorney, Agent, or Firm—F. D. LaRiviere

[57] ABSTRACT

Method and apparatus for minimizing the work required for moving, handling, and rolling heavy boxes and the like having a center of gravity. The apparatus incorporates a ramp contoured to the locus of points described by the surfaces of the workpiece as that workpiece rotates about its center of gravity, as that center of gravity is horizontally translated while simultaneously maintained at constant vertical elevation.

11 Claims, 14 Drawing Figures

METHOD AND APPARATUS FOR MOVING AND HANDLING HEAVY OBJECTS

BACKGROUND AND SUMMARY OF THE INVENTION

The invention pertains to the art of handling and moving bulky objects. In the fields of manufacturing, warehousing, et cetera, it is often necessary to repetitively move large numbers of identical objects. In many cases such items are large, bulky and heavy. In manufacturing, often the form of motion required includes rolling to provide access to facilitate assembly and testing of variously located parts of a workpiece. Frequently such objects must be moved by hand. This invention significantly reduces the work required to move such objects by reducing the amount of energy expended.

Methods developed in the past commonly include various types of hand trucks, self dumping hoppers and pivoted or leveraged machines. The present invention significantly and surprisingly reduces work without recourse to complex and expensive auxiliary machines.

This invention provides a method for rolling heavy, bulky workpieces from one point to another with a minimum expenditure of mechanical work. This invention also provides a method for rapidly handling large numbers of identical heavy, bulky workpieces in sequence.

These advantages of the invention are provided by a ramp having a surface contoured to correspond with the contour of the workpiece to be moved as it rotates about its center of gravity (CG) which remains at a constant elevation as it horizontally translates along the ramp. The simplest example of such a ramp is a flat horizontal plane in conjunction with a circular object such as a wheel or a ball having a geometrically central CG. However, many objects do not meet the criteria of symmetry and concentricity of a wheel. Thus, a ramp constructed according to the present invention facilitates rolling an aconcentric, asymmetric workpiece without changing the elevation of the CG of that workpiece, and a method for designing the contour of that ramp.

One of the simplest and most common shapes which must be handled is the rectangular box. Yet, in order to determine the contour of a ramp according to this invention, a series of complex analytical steps must be accomplished. Even for the case, of the rectangular box, where the rolling contour of the workpiece comprises straight lines, the equation for the profile of the ramp surface is complex. In cases where said rolling contour is curvilinear, an equation describing the corresponding ramp surface may be determined by the same series of analytical steps.

A solution can be determined by competent designers for any workpiece which does not include an unrounded acute angle corner through which it must be rolled. When acute angle corners are encountered, the extent of rounding required to accommodate this invention without binding depends on the sharpness of the angle and the overall contour of the rolling workpiece. Therefore, the extent of corner rounding will vary from case to case and must be determined by the designer.

Another important feature of the invention is the contact material between the rolling workpiece and the ramp. If significant slippage were to occur between the workpiece and the ramp, the elevation of the CG and the geometric relationship between the contact surfaces would both change. Therefore, it is extremely important that such slippage be prevented.

DESCRIPTION OF THE PREFERRED EMBODIMENT

To facilitate understanding of the present invention, the following definitions of terms are used in this specification.

Workpiece: A rigid body, having a center of gravity and substantially prismatic external contour. The cross-sectional shape of the workpiece may be a regular or irregular convex polygon, which may have rounded corners or sides. Examples of workpieces include slabs, rectangular boxes, extruded bar stock, hexagonal stock, rods, tubes, cans, rounds loaded pallets, and the like.

Rotation: Angular movement of a workpiece about an axis without translation.

Centroidal Rotation: Angular movement of a workpiece about an axis which passes through its center of gravity without translation.

Translation: Linear movement of a workpiece without rotation. In the specification, the reference point for translation of a workpiece is its center of gravity.

Rolling: Simultaneous centroidal rotation and horizontal translation of a workpiece while in contact with a supporting surface without slippage.

Figure 1:
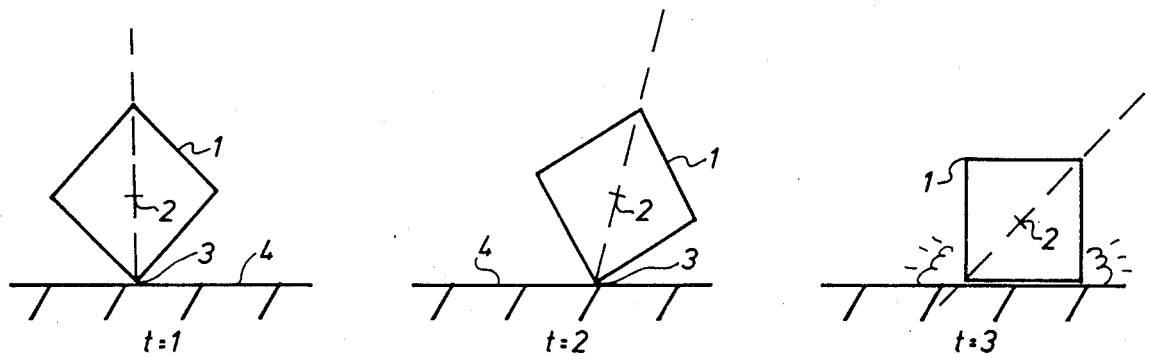
FIG. 1 is a "time lapse" illustration of a workpiece rolling on a flat surface.

The preferred embodiment is the case where the contour of the workpiece comprises entirely planar or flat surfaces. Referring now to FIG. 1, workpiece 1 is shown in a position where CG 2 is vertically above corner 3 of workpiece 1 so that CG 2 at its highest point relative to supporting surface 4. As workpiece 1 rotates about corner 3, CG 2 becomes progressively lower in elevation relative to supporting surface 4 and also becomes offset relative to corner 3 thereby creating a moment arm which tends to cause workpiece 1 to drop onto supporting surface 4 due to the force of gravity. In order to return workpiece 1 to its original position, sufficient force would have to be applied to workpiece 1 to raise CG 2 back to its initial position. The work required to accomplish this task equals the difference in elevation from the initial position to the final position times the weight of workpiece 1.

Figure 2:
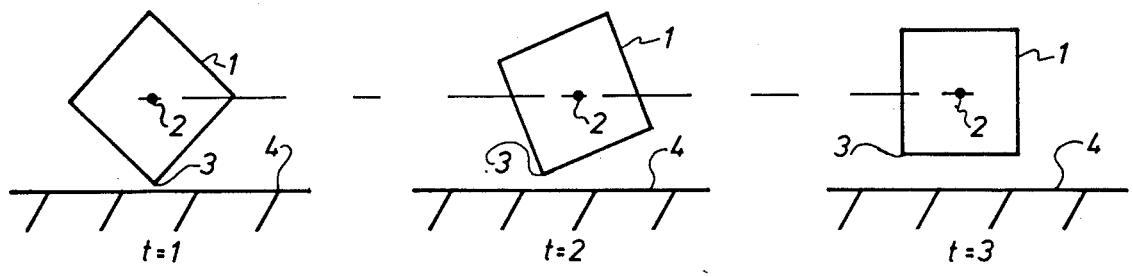
FIG. 2 is a "time lapse" illustration of a workpiece rolling about an axis through its CG with imaginary support.

Referring now to FIG. 2, if some means were available to retain CG 2 at a constant elevation while workpiece 1 rotates about CG 2 as though CG 2 were supported by an axle, the work required to accomplish the task would be limited only to the work necessary to overcome the rotational inertia of workpiece 1.

Figure 3:
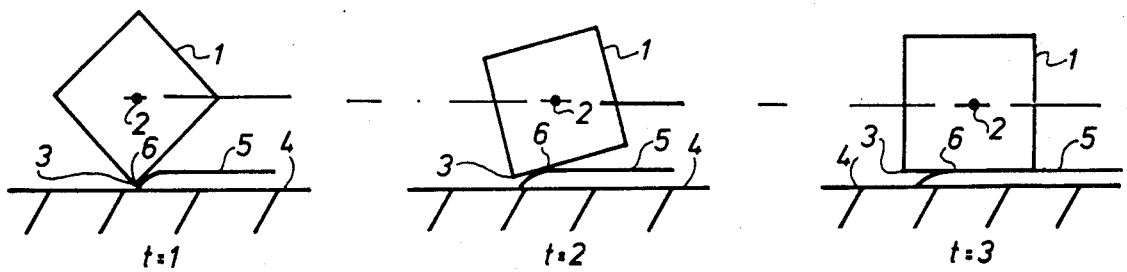
FIG. 3 is a "time lapse" illustration of a workpiece rolling on a ramp which permits only rotation and horizontal translation of the workpiece's CG.

In FIG. 3, ramp 5 is designed such that CG 2 is in fact maintained at a constant elevation while workpiece 1 rotates about CG 2, provided CG 2 is permitted to translate horizontally as workpiece 1 rolls on said ramp 5. In order for ramp 5 to operate as shown, certain limitations must be ascribed to the system. To prevent a moment arm from being created between support 6 of workpiece 1 and CG 2, support 6 must be maintained exactly below CG 2. Further, in order for ramp 5 to rollably support the weight of workpiece 1, slippage, or relative movement, between workpiece 1 and ramp 5 must be prevented. This antislipping constraint also assumes that the locus of points describing the contour of ramp 5 also describes and corresponds to points on the contour of workpiece 1 as it rotates about CG 2. Support point 6 of workpiece 1 instantaneously experiences zero translation relative to ramp 5 when located vertically below CG 2.

Figure 4:
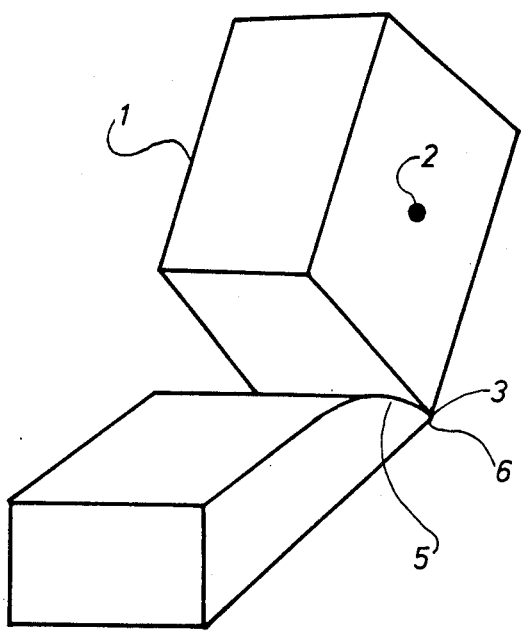
FIG. 4 is an isometric view of a rectangular workpiece—ramp system constructed according to the principles of the present invention.

The three dimensional contraints of the system can be seen in FIG. 4. Since workpiece 1 will be rotating about an axis through CG 2, for zero translation at support points 6, all points on the interface between ramp 5 and workpiece 1 are instantaneously equidistant from said axis. Hence, interface 6 must alway comprise either a straight line or a point. Thus, because of this constraint, positioning and alignment of workpiece 1 on ramp 5 is critical in the initial set-up of the system.

Figure 5:
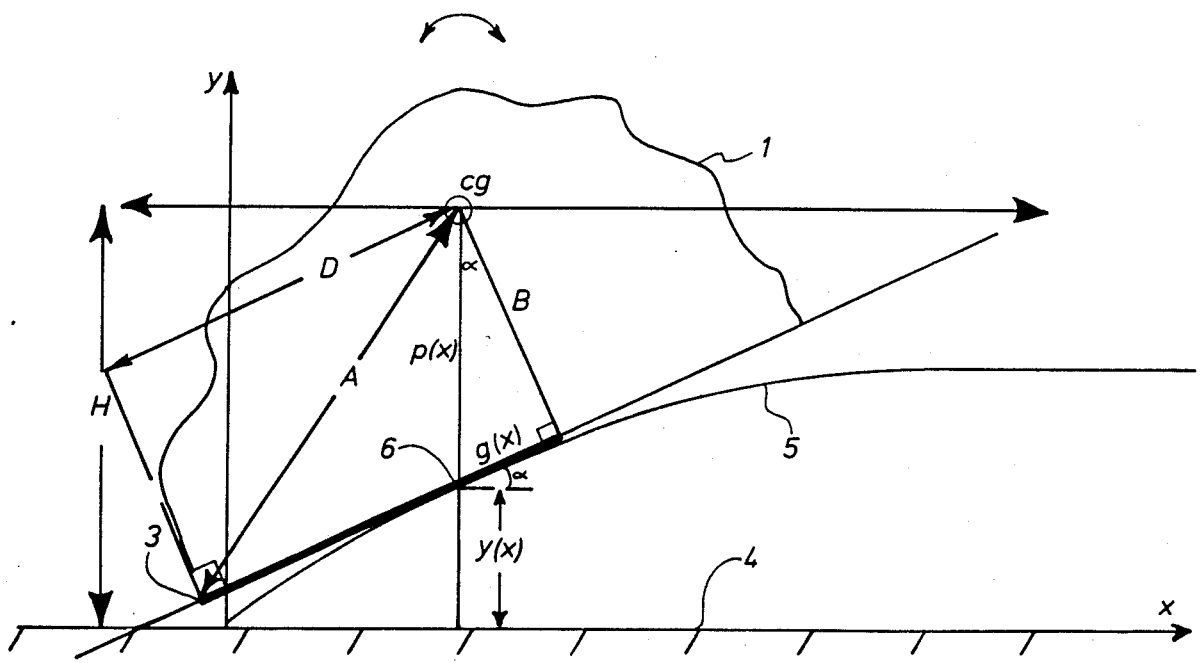
FIG. 5 is an analytical geometry diagram of the workpiece—ramp system of FIG. 4.

Referring now to FIG. 5, the design of the general case of the ramp corresponding to workpiece 1 having a flat sided contour can be derived. Since support interface 6 must be vertically below the CG 2, the following differential analysis becomes apparent to designers skilled in the art.

$$\frac{dy}{dx} = \tan\alpha = g/B = y' = M$$

$g^2 + B^2 = p^2$
$M^2B^2 + B^2 = p^2$
$p = (M^2B^2 + B^2)^{\frac{1}{2}}$
$p + y = H$
$(M^2B^2 + B^2)^{\frac{1}{2}} + y = H$
$H - y = (M^2B^2 + B^2)^{\frac{1}{2}}$
$H^2 - 2Hy + y^2 = M^2B^2 + B^2$ $$\frac{1}{B^2}(y^2 - 2Hy + H^2 - B^2) = M^2$$

$1/B (y^2 - 2Hy + H^2 - B^2)^{\frac{1}{2}} = M - dy/dx$
$1/B \, dx - (y^2 - 2Hy + H^2 - B^2)^{\frac{1}{2}} dy$ -continued
$1/B/dx - /(y^2 - 2Hy + H^2 - B^2)^{\frac{1}{2}} dy$
FROM STANDARD INTEGRAL TABLES:
$x/B = \ln[(y^2 - 2Hy + H^2 - B^2)^{\frac{1}{2}} + y - H] + C$
$e^{x/B} = e^{(ln[(y^2-2Hy+H^2-B^2)^{\frac{1}{2}}+y-H]+C)}$
$e^{x/B} = (e^c)[e^{ln}[(y^2 - 2Hy + H^2 - B^2)^{\frac{1}{2}} + y - H]] =$
$\qquad e^c[(y^2 - 2Hy + H^2 - B^2)^{\frac{1}{2}} + y - H]$
$e^{x/B} e^{-c} - y + H = (y^2 - 2Hy + H^2 - B^2)^{\frac{1}{2}}$
Let $e^{-c} = k$, then:
$(k e^{x/B} + H - y)^2 = y^2 - 2Hy + H^2 - B^2$
BY SQUARING AND SIMPLIFYING THE LEFT SIDE,
$k e^{x/B} = 2H - 2y + (B^2/k) e^{-x/B} = 0$ $$y = \frac{k e^{x/B}}{2} + H + \frac{B^2 e^{-x/B}}{2k}$$

Let $y(0) = 0$ $$0 = \frac{k}{2} + H + \frac{B^2}{2k}$$

BUT, by definition $H = A$, SO:
$k = -A + (A^2 - B^2)^{\frac{1}{2}} = -A \pm D$ $$y = \frac{(\pm D - A)e^{x/B}}{2} + A + \frac{B^2 e^{-x/B}}{2(\pm D - A)}$$

$$= \frac{(D - A)e^{x/B}}{2} + A + \frac{A^2 - D^2}{2(D - A)} e^{-x/B}$$

$$= \frac{(D - A)}{2} e^{x/B} + A - \frac{(D + A)}{2} e^{-x/B}$$

$$= \frac{(D)}{2} e^{x/B} - \frac{(A)}{2} e^{x/B} + A - \frac{(D)}{2} e^{x/B} - \frac{(A)}{2} e^{x/B}$$

$$= A - \left[\frac{(A)}{2} e^{x/B} + \frac{(A)}{2} e^{x/B}\right] + \left[\frac{(D)}{2} e^{x/B} - \frac{(D)}{2} e^{x/B}\right]$$

$y = A - A \cosh(x/B) + D \sinh(x/B)$

This equation expresses in hyperbolic trigonometric terms a family of curves which describe the contour of the preferred embodiment of the invention where B is the value of the y-coordinate and D is the value x-coordinate of the CG in an orthogonal rectangular coordinate system within the workpiece. Thus, in this analysis the coordinate system rotates with workpiece 1 as it rolls along the ramp.

Figure 6:
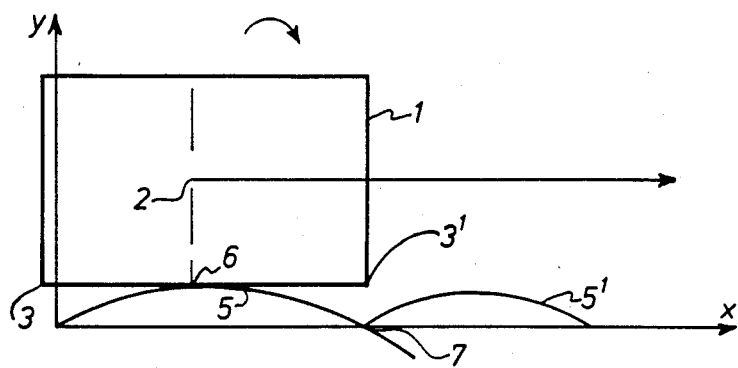
FIG. 6 is a schematic diagram of a continuous system of ramps according to the invention permitting continuous rotation of a workpiece.

Referring now to FIG. 6, workpiece 1 could be rolled beyond high point of contour 5 on a continuation of the ramp. Thus, low point 7 corresponds to the position of workpiece 1 when CG 2 is vertically above new corner 3' and the rolling contour of workpiece 1 is subsequently supported on new contour 5'.

Figure 7:
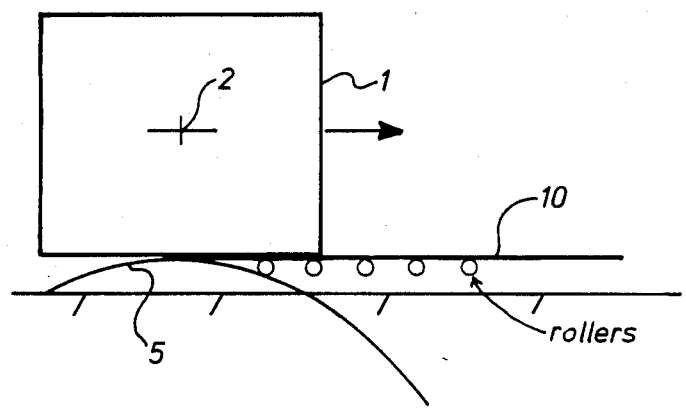
FIG. 7 is a schematic diagram of a system comprising a workpiece, a ramp according to the invention and a conveyor.

As shown in FIG. 7, conveyor 10 is designed to intersect the high point of ramp 5 so that workpiece 1 can easily be loaded on to or off of conveyor 10 located adjacent ramp 5.

To prevent significant slippage of the workpiece with respect to the ramp, a sheet of relatively deformable material is anchored to the surface of the ramp to provide rolling friction for the workpiece to engage while rolling along the ramp. Such deformable material may be a sheet of stiff rubber or neoprene of thickness ranging from 1/16" to 3/16". The rolling friction material may be affixed to the ramp or to the workpiece or both.

Figure 11:
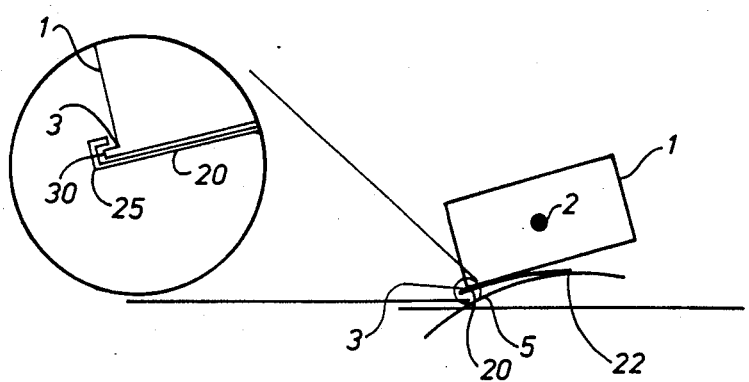
FIG. 11 is a schematic diagram showing a system having a rolling-friction sheet which follows the rolling workpiece.

For heavy objects, the deformable rolling-friction material is not always adhered to the ramp over its entire surface. Rather, as shown in FIG. 11, material 20 is attached to ramp 5 only at high point 22. The remainder of said material lays loosely on ramp 5 until hook 25, which is attached to the lower end of material 20, engages flange 30 on corner 3 of workpiece 1. Then material 20 conforms to the contour of ramps and follows workpiece 1 as it rolls either up or down ramp 5. Hence, material 20 prevents slippage between workpiece 1 and ramp 5 by its rolling friction characteristics. Tension in material 20 between high point 22 and hook 25 created by the weight of workpiece 1 resting in hook 25 further assures that workpiece 1 will not slip just as it begins to engage ramp 5.

Figure 8:
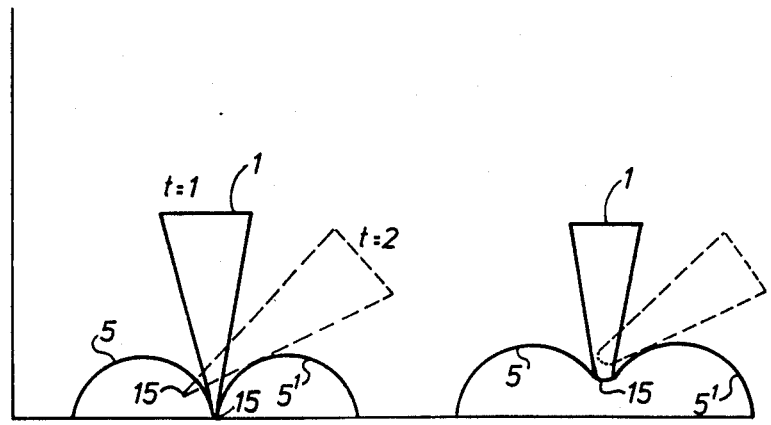
FIG. 8 is a schematic diagram showing the difference in operation of a workpiece—ramp system where the workpiece includes an acute angle corner versus one with a rounded acute angle corner.

Referring now to FIG. 8A, as workpiece having acute angle corner 15 beyond low point 7 in ramp 5, is rolled upward onto ramp contour 5′, corner 15 projects into contour 5. This interference will prevent the invention from working. As shown in FIG. 8B, the designer can overcome this problem by relieving acute angle corner 15 and matching the ramp contour thereto so that no interference between acute angle corner 15 and ramp contour 5 develops.

Figure 9:
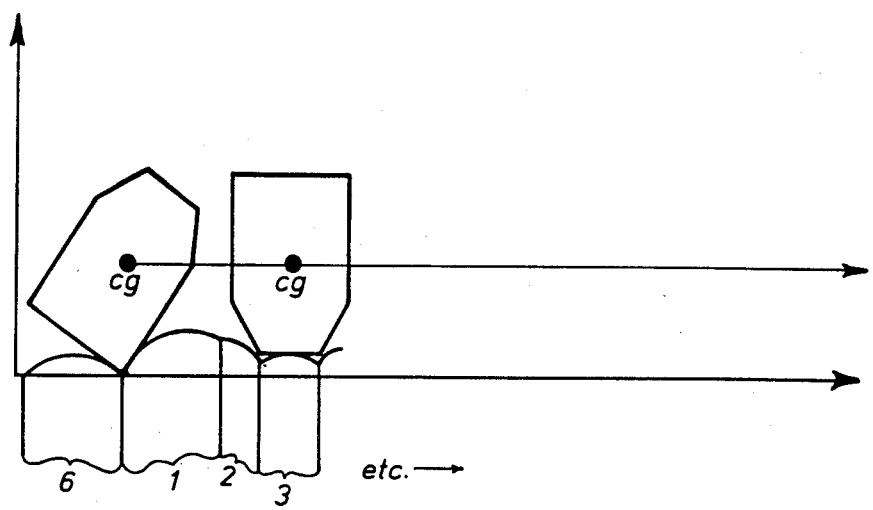
FIG. 9 is a schematic diagram of a system having an irregular multifaceted workpiece.

In FIG. 9, it can be seen that the present invention as described can accommodate any irregularly shaped workpiece provided it comprises planar sides having approximately rounded acute angle corners where necessary.

Figure 10:
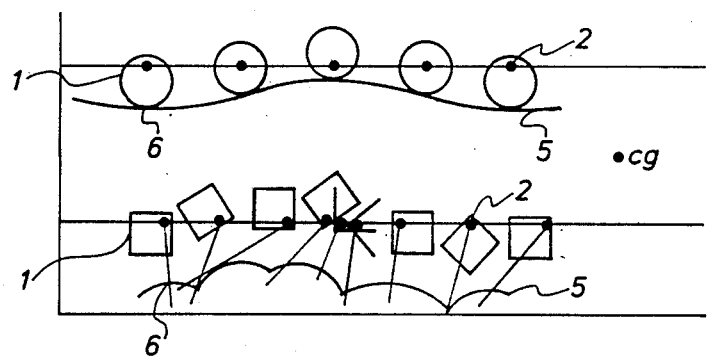
FIG. 10 is a schematic diagram showing systems having workpieces with aconcentric centers of gravity.

Referring now to FIG. 10, it can be seen that the invention can be equally applied to circular or non-circular items with an eccentric CG without changing the design process. For each case, the designer must first determine the location of the CG relative to the contour of the workpiece. The locus of points representing the contour of the ramp must then be determined by differentially following the locus points of support interface 6 of workpiece 1, where CG 2 moves horizontally and where support interface point 6 is always disposed directly below CG 2 and always has zero translation at the instant of contact. This will often require the designer to model the contour of workpiece 1 in order to accomplish the calculus necessary to model the locus of the contour of ramp 5.

Figure 12:
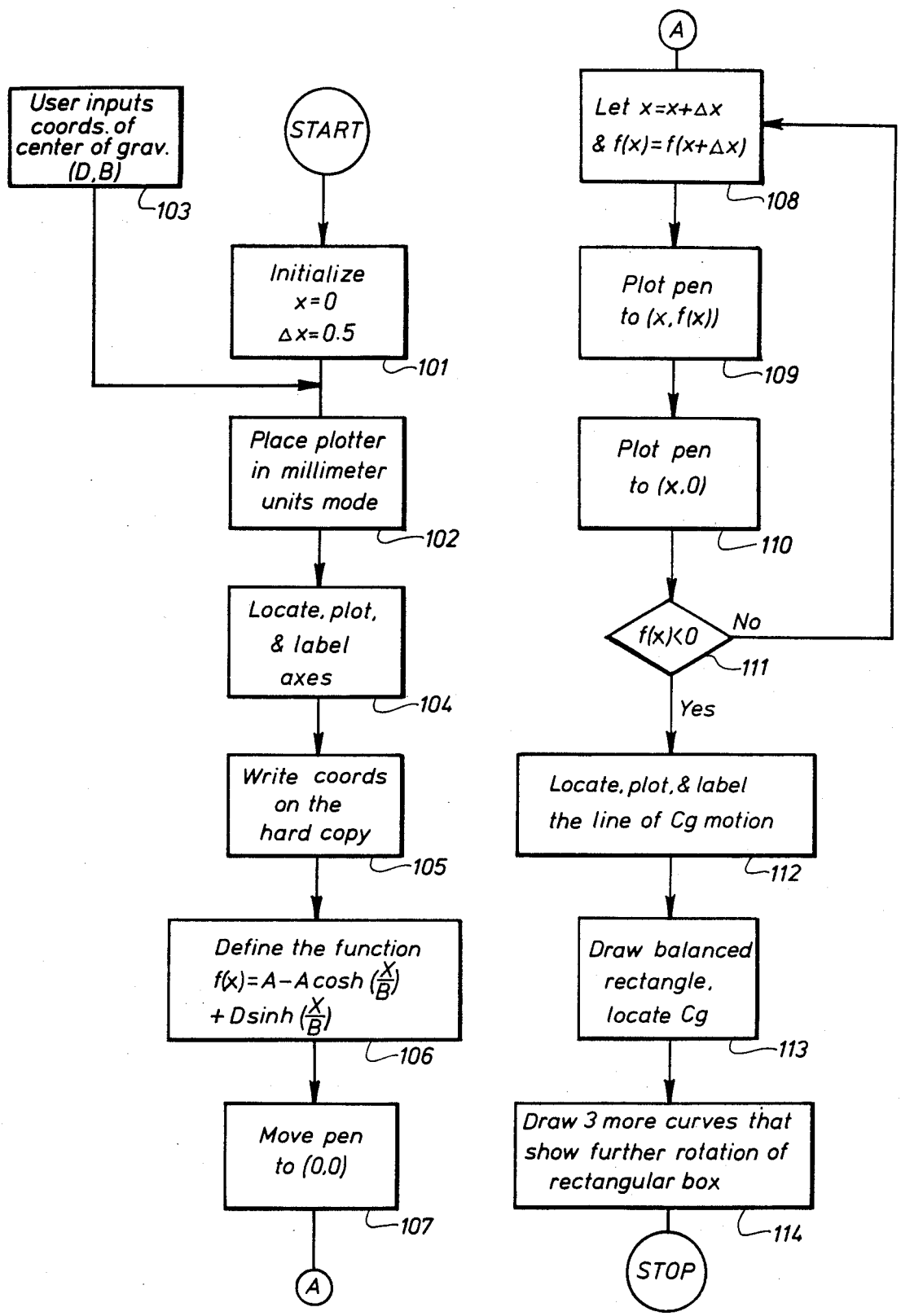
FIG. 12 is a flow diagram for computing the profile of a ramp constructed according to the principles of the present invention for the workpiece of FIG. 4.

Table I is a complete listing of all of the routines and subroutines of instructions employed in accordance with FIG. 12 to provide a full-scale profile of the contour of a ramp constructed according to the present invention as shown in FIG. 13 for rolling a heavy box having its CG at linear coordinates x and y.

As shown in FIG. 12, the present invention includes a method for computing and plotting the profile of the contour of a ramp for rolling a box without changing the vertical height of the CG thereof. Block 101 initializes the x variable at x=0. It also establishes the size of the incrementing factor $\Delta x$ for plotting at $\Delta x=0.5$. Block 102 scales the plotter in millimeters. Units of measure on the full scale plotted hardcopy will then be in units of millimeters. Block 103 allows the designer to enter the location of the CG within the object into the computer via a keyboard terminal. The location is specified as x and y coordinates (in millimeters) with the origin at the corner of the rotating box.

Referring again to FIG. 12, Block 104 locates, plots and labels the x and y axes (133 of FIGS. 13A and 13B), which are used as the basis for a plot of the locus of points describing the surface of the ramp. These axes are separate and unique from the axes which are used to locate the CG within the object and which are a frame of reference which moves with the object.

Figure 13A:
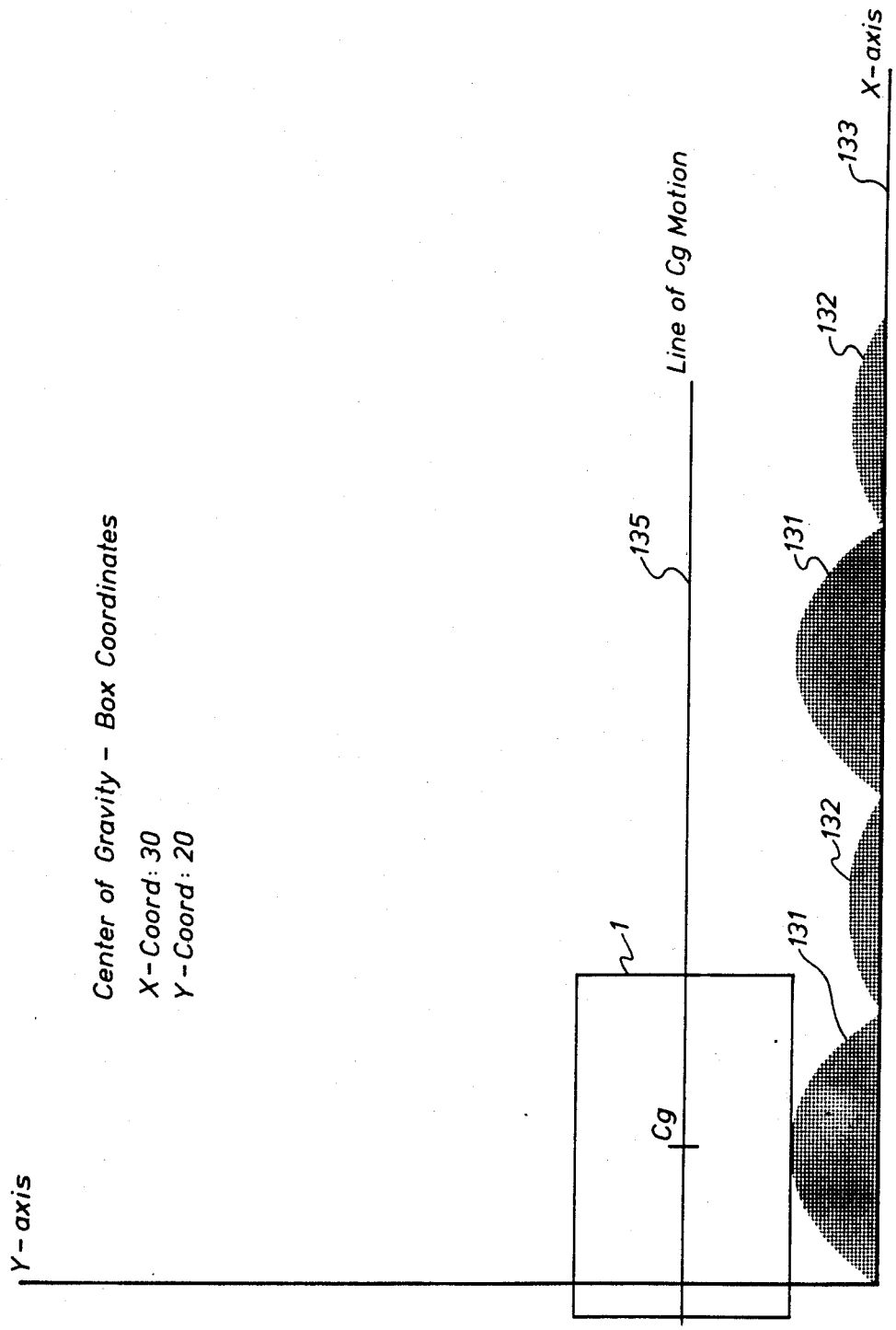
FIGS. 13a and 13b are profiles of the ramp of FIG. 12.
Figure 13B:
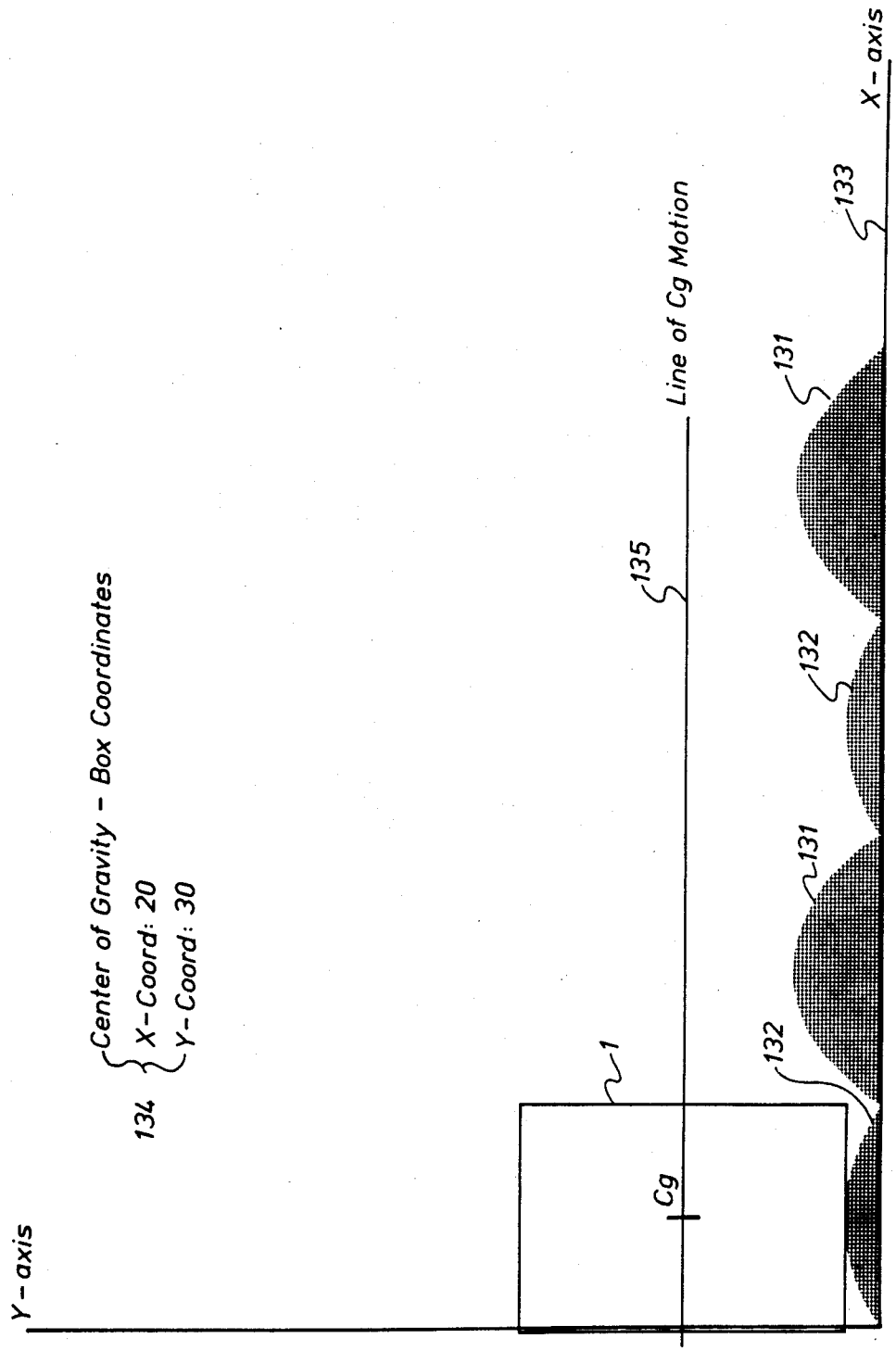

Block 105 plots out the words "x-coord:" and "y-coord:" and the coordinates of the CG of the rolling object entered by the designer at Block 103 as shown at 134 of FIGS. 13A and 13B.

Block 106 defines the function $F\alpha = A - A \cosh(x/B) + D \sinh(x/B)$ which is the equation of the curve which will be plotted, where D and B were entered by the designer at Block 103 and $A = D^2 + B^2$.

Block 107 moves the plotter pen to the origin, where the plot will begain.

Block 108 of FIG. 12 increments x by $\Delta x$ by defining $x = x + \Delta x$ and $F(x) = F(x + \Delta x)$, and computing $F(x + \Delta x)$.

Block 109 of FIG. 12 moves the plotter pen to the newly calculated point on the curve.

Block 110 of FIG. 12 moves the plotter pen vertically downward to the x-axis to provide contrast for the profile of the ramp.

Block 111 of FIG. 12 is a decision mode. If the value calculated for F(x) is less than 0, then the program moves to Block 112. If the value of F(x) is zero or greater the program returns to Block 108, and new values for x and F(x) are calculated per Block 108. Thus, the entire ramp profile is produced.

Block 112 of FIG. 12 locates, plots and labels the line which the CG will follow as workpiece 1 rolls along the ramp. This is shown by 135 of FIGS. 13A and 13B.

Block 113 of FIG. 12 draws the contour of the object to be rotated, in the case of the preferred embodiment, rectangular box 1 balanced at the maximum point of the plotted curve, 131 in FIG. 13A. The CG is located and labeled within the rectangular box.

Block 114 of FIG. 12 plots additional curves, required to correspond with the remaining sides of the object plotted in Block 113.

FIGS. 13a and 13b illustrate the versatility of the present invention. In FIGS. 13a and 13b, the profile of a ramp is shown for horizontally translating a box from two different starting orientations. Thus, ramp 131 is specified for the larger side of workpiece 1 and ramp 132 is specified for the shorter side of workpiece 1 with respect to the starting orientation of workpiece 1.

In practice, a ramp designed in accordance with the principles of the present invention receives a workpiece at a point where the relative geometries correspond and rolling friction material is aligned to prevent relative slippage. Once aligned, the workpiece can be rolled along the ramp by simply applying sufficient force to overcome torsional momentum and rolling friction at its point or line of contact with the ramp's surface. As stated elsewhere in this specification, the ramp of the present invention always provides support for the workpiece at a contact point or line orthogonal to the direction of horizontal translation of the workpiece without change of the elevation of the CG. Obviously, since the CG always remains over the point of contact, the workpiece is always balanced. Hence, the workpiece can be stopped, and it will remain, at any point and in any rotational orientation during translation along the ramp.

We claim:

1. A method for supporting a rolling workpiece having a rigid contour and a center of gravity comprising the steps of:

contouring a non-planar ramp to correspond to the locus of points described by the contour of the workpiece which instantaneously lie vertically below the center of gravity as the workpiece rolls in a direction orthogonal to an axis through the center of gravity without any change in the elevation of said axis and;

providing friction means so as to prevent slippage at all points at which the workpiece contacts the ramp whereby the ramp surface provides continuous rolling support for the entire transit of said workpiece.

2. The method of claim 1, wherein the step of preventing slippage comprises placing at least one sheet of deformable material between the workpiece and the ramp.

3. The method of claim 2 wherein the step of placing at least one sheet of deformable material further includes the step of adhering the material to the ramp at all points at which the workpiece contacts the ramp.

4. The method of claim 2 wherein the step of preventing slippage further includes the steps of:
fastening the deformable sheet to the ramp at the vertically highest contact point thereof only;
coupling the deformable sheet to the workpiece at a location corresponding to the vertically lowest contact point of the ramp; and
decoupling the deformable sheet from the workpiece as it rolls over the highest contact point.

5. In a system involving a workpiece having a rigid contour and a center of gravity, the method of designing a non-planar ramp for supporting a rolling and translating workpiece, said method comprising the steps of:
determining an axis through the center of gravity about which the workpiece is to roll;
determining the contour of a ramp corresponding to the locus of points described by the contour of the workpiece which instantaneously lie vertically below the center of gravity of the workpiece as the workpiece simultaneously rotates around said axis and horizontally translates orthogonal to said axis without any change in the vertical elevation of said axis whereby the ramp surface provides continuous rolling support for the entire transit of said workpiece.

6. The method of claim 5 wherein the step of determining an axis through the center of gravity employs an orthogonal rectangular coordinate system having its origin on the contour of the workpiece.

7. The method of claim 6 wherein:
the contour of the workpiece is a flat-sided convex polygon; and
the locus is represented by a curve selected from the family of curves, defined by the equation $y = A - A \cosh(x/B) + D \sinh(x/B)$, where D is the x-coordinate and B is the y-coordinate of the center of gravity, A is the positive square root of the squares of B and D and the x-axis is located along the horizontally translating contour of the workpiece.

8. Apparatus for supporting a rolling workpiece having a rigid contour and a center of gravity, said apparatus comprising:
non-planar ramp means having a contour corresponding to the locus of points described by the contour of the workpiece which instantaneously lie vertically below the center of gravity of the workpiece as the workpiece rolls without any change in the vertical elevation of an axis through the center of gravity; and
friction means to prevent slippage at all points at which the workpiece contacts the ramp means whereby the ramp surface provides continuous rolling support for the entire transit of said workpiece.

9. The apparatus of claim 8 wherein the friction means comprises at least one sheet of deformable material placed between the workpiece and the ramp means.

10. The apparatus of claim 9 wherein the sheet is adhered to the ramp means at all points at which the workpiece contacts the ramp means.

11. The apparatus of claim 9 wherein:
the ramp means has a first vertically highest contact point and a first vertically lowest contact point on its contour; and
the friction means is fastened to the ramp means at the first vertically highest contact point only and corresponds to the contour of the ramp means from the first vertically highest contact point to the first vertically lowest contact point;
said friction means further including hook means at the location corresponding to the first lowest contact point of the ramp means for coupling to the workpiece at the point corresponding to the first lowest contact point and for decoupling from the workpiece as it rolls over the first highest contact point.

* * * * *